(12) United States Patent
Kashi et al.

(10) Patent No.: US 10,722,326 B2
(45) Date of Patent: Jul. 28, 2020

(54) DUAL ENDED DISPOSABLE MULTI-TOOL DENTAL APPLICATOR WITH INTERCHANGEABLE TOOLS

(71) Applicants: Ajay Kashi, Rochester, NY (US); Iswara Prasad Parvathaneni, Pittsford, NY (US)

(72) Inventors: Ajay Kashi, Rochester, NY (US); Iswara Prasad Parvathaneni, Pittsford, NY (US)

( * ) Notice: Subject to any disclaimer, the term of this patent is extended or adjusted under 35 U.S.C. 154(b) by 103 days.

(21) Appl. No.: 16/045,580

(22) Filed: Jul. 25, 2018

(65) Prior Publication Data

US 2018/0325623 A1    Nov. 15, 2018

Related U.S. Application Data

(63) Continuation-in-part of application No. 15/480,675, filed on Apr. 6, 2017, now Pat. No. 10,064,701.

(51) Int. Cl.

| | |
|---|---|
| *A61C 3/00* | (2006.01) |
| *A61C 1/14* | (2006.01) |
| *A61C 1/10* | (2006.01) |
| *A61C 5/62* | (2017.01) |
| *A61C 3/06* | (2006.01) |
| *A61C 1/12* | (2006.01) |

(52) U.S. Cl.
CPC .............. *A61C 1/147* (2013.01); *A61C 1/10* (2013.01); *A61C 1/12* (2013.01); *A61C 3/005* (2013.01); *A61C 3/06* (2013.01); *A61C 5/62* (2017.02); *A61C 2201/002* (2013.01)

(58) Field of Classification Search
CPC .... A61C 3/00; A61C 5/60; A61C 5/62; A61C 3/005; A61C 3/08; A61C 5/00
See application file for complete search history.

(56) References Cited

U.S. PATENT DOCUMENTS

| 4,767,332 A * | 8/1988 | Weissman ................ A61C 5/35 433/225 |
| 5,150,495 A * | 9/1992 | Discko, Jr. ............ A46B 5/0075 15/106 |
| 6,049,934 A * | 4/2000 | Discko ..................... A46B 5/00 15/105 |
| 6,592,280 B2 * | 7/2003 | Petrich ..................... A61C 5/62 401/126 |

(Continued)

*Primary Examiner* — Nicholas D Lucchesi
(74) *Attorney, Agent, or Firm* — Sonya C. Harris; Invention Services

(57) ABSTRACT

A dual-ended triple tooled dental applicator apparatus, comprising a plurality of tools with interchangeable dental tool applicators. The dental apparatus further comprises an elongated handle having two distinct tools on both ends and being detachable and interchangeable. During procedures, the dentist can alternate between both ends of the apparatus and among three dental tool applicators. A set of overlapping and circumferential friction enhancement means, along and about the apparatus, facilitate safe and effective handling during procedures. The multi-functioned dental apparatus is comprised of a lightweight but rigid material (e.g., plastic), which allows the dentist to efficiently use the same tool for working with and applying different materials to a patient's teeth. Upon completion of a given procedure, the entire device may be readily disposable.

10 Claims, 3 Drawing Sheets

(56) References Cited

U.S. PATENT DOCUMENTS

| | | | |
|---|---|---|---|
| 6,634,051 B1 * | 10/2003 | Dragan | A46B 5/00 15/105 |
| 6,957,958 B2 * | 10/2005 | Rowe | A61C 5/60 206/209 |
| D661,396 S * | 6/2012 | Garrison | D24/152 |
| 8,584,301 B2 * | 11/2013 | Maissami | A61C 3/005 15/167.1 |
| 9,463,287 B1 * | 10/2016 | Lorberbaum | H04W 4/80 |
| 2001/0054211 A1 * | 12/2001 | Cabedo-Deslierres | A46B 5/0016 15/106 |
| 2002/0027088 A1 * | 3/2002 | Discko, Jr. | A61M 35/003 206/229 |
| 2003/0093026 A1 * | 5/2003 | Petrich | A61C 5/62 604/1 |
| 2003/0186195 A1 * | 10/2003 | Comfort | A61C 3/08 433/164 |
| 2004/0267181 A1 * | 12/2004 | Tuite | A61B 10/02 604/1 |
| 2005/0069373 A1 * | 3/2005 | Parikh | A46B 9/005 401/183 |
| 2005/0100860 A1 * | 5/2005 | Kameli | A61C 3/00 433/144 |
| 2006/0271061 A1 * | 11/2006 | Beyar | A61B 1/00071 606/105 |
| 2011/0024462 A1 * | 2/2011 | Teys | A47G 21/004 222/192 |
| 2011/0143314 A1 * | 6/2011 | Maissami | A61C 3/00 433/147 |
| 2012/0198635 A1 * | 8/2012 | Hilscher | A61B 18/00 15/22.1 |
| 2016/0143704 A1 * | 5/2016 | Fishburne | A61C 1/145 433/147 |
| 2018/0310700 A1 * | 11/2018 | Cordero | A46B 9/028 |

* cited by examiner

DUAL ENDED DISPOSABLE MULTI-TOOL DENTAL APPLICATOR WITH INTERCHANGEABLE TOOLS

PRIOR APPLICATIONS

This application is a Continuation in Part of application Ser. No. 15/480,675, filed Apr. 6, 2017.

FIELD OF INVENTION

The present invention relates to a disposable applicator for applying different materials, and in particular to a disposable dental applicator having multiple tools used to apply dental materials.

BACKGROUND

Applicators such as brushes, foam pads, cotton fiber or other applicators, are used to apply a variety of materials in many applications. Such applicators are of particular use in dentistry for applying various dental materials. as many dental procedures require various dental materials, such as sealants, bonding agents and the like, to be painted onto a tooth in thin, even coatings or layers. Also, it invariably happens that after several uses, the dental materials would tend to accumulate onto reusable dental applicators resulting in a time-consuming cleaning problem. Moreover, because of the need for sterilization to prevent cross-contamination between patients, the use of multiple applicators requiring frequent cleaning have been used. Because the dental materials in current use include various materials that cure in a relatively short period, cleaning and/or sterilization of such dental devices proves difficult, costly and in some cases unsafe. With the advent of contagious and dangerous communicable diseases and the quick setting dental materials tools that can be readily disposed of are beneficial to dental procedures. In view of the above listed shortcomings, a disposable multi-functioning, interchangeable, multi-tooled applicator is desirable. As a result, it is necessary to produce a double-ended multiple-tooled dental applicator apparatus that is efficient and easy to handle at a low cost.

SUMMARY OF THE INVENTION

The present invention addresses the above-described deficiencies and others as described further below. Specifically, the present invention provides a dual-ended disposable multi-tool dental applicator apparatus with interchangeable tools that is disposable.

In accordance with an aspect of the present disclosure, the instant invention provides a low cost, easy to manufacture, disposable dental tool comprised of lightweight but sufficiently rigid, readily available material such as plastic.

The instant invention advantageously allows for the ability of at least three dental applicator tools all within a dual sided body having detachably interchangeable tools providing enhanced versatility and faster procedures.

In accordance with an aspect of the present disclosure, the instant invention provides a double ended, inexpensive, easily disposable device providing various tools that facilitate multiple functions within a unitary apparatus.

In accordance with another aspect of the present disclosure, the instant invention provides a multiple function applicator apparatus with enhanced gripping means for facilitating increased safety, speed and efficiency with performing dental procedures.

In accordance with another aspect of the present disclosure, the instant apparatus is a lightweight uncomplicated structure comprised of a dual sided, double tooled applicator apparatus with interchangeable tools that is easily discarded after use and is made of readily available materials allowing for easy and low cost manufacture.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

BRIEF DESCRIPTION OF THE DRAWINGS

Embodiments of the present disclosure are described herein with reference to the drawings, in which.

The novel features which are characteristic of the invention, as to organization and method of use, together with further objects and advantages thereof, will be better understood from the following disclosure considered in connection with the accompanying drawings in which one or more preferred embodiments of the invention are illustrated by way of example. It is to be expressly understood, however, that the drawings are for the purpose of illustration and description only and are not intended as a definition of the limits of the invention.

As used herein, the term "comprises" refers to a part or parts of a whole, but does not exclude other parts. That is, the term "comprises" is open language that requires the presence of the recited element or structure or its equivalent, but does not exclude the presence of other elements or structures. The term "comprises" has the same meaning and is interchangeable with the terms "includes" and "has". The term set has the meaning of one or more of said element. Furthermore, any use of the term "or" as used herein is generally intended to mean "and/or" unless otherwise indicated. Combinations of components or steps will also be considered as being noted, where terminology is foreseen as rendering the ability to separate or combine is unclear.

BRIEF DESCRIPTION

Figure 1:
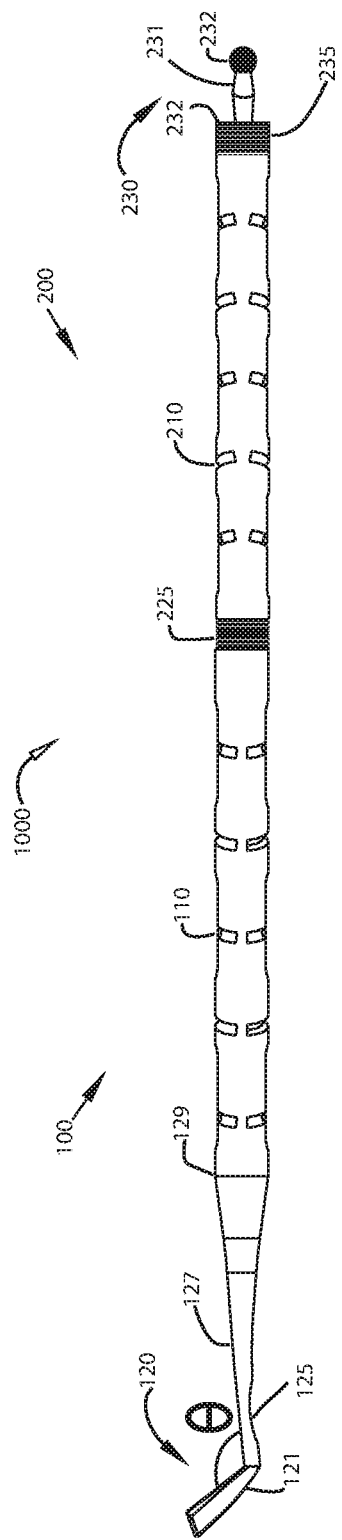
FIG. 1 is an elevational side diagrammatic view of the dual-ended disposable multi-tool dental applicator apparatus with interchangeable tools, illustrating the first and second tool components of the applicator apparatus attached to one another in accordance with an embodiment of the present invention.
Figure 2:
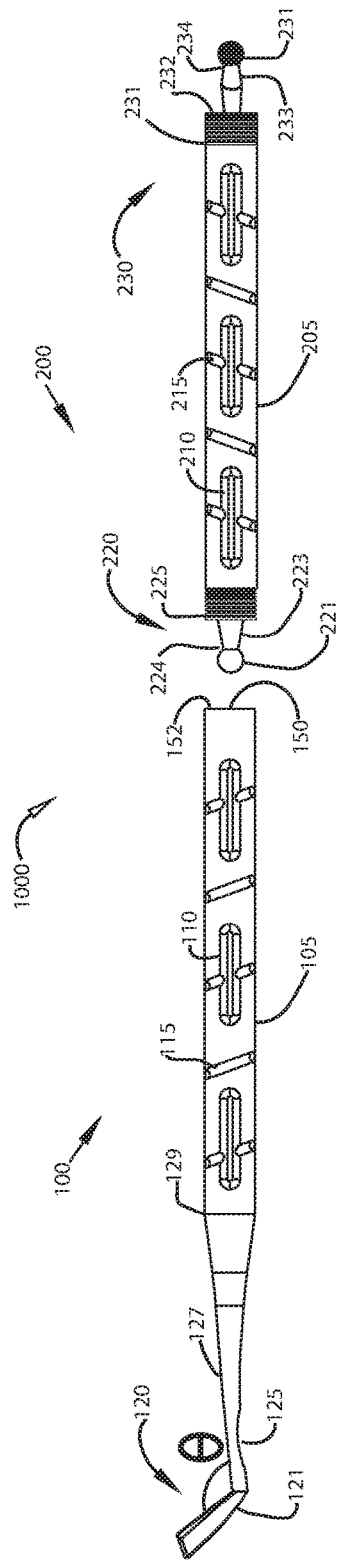
FIG. 2 is an elevational side diagrammatic view of the dual-ended disposable multi-tool dental applicator apparatus with interchangeable tools, illustrating the first and second tool components separated in accordance with an embodiment of the present invention.
Figure 3:
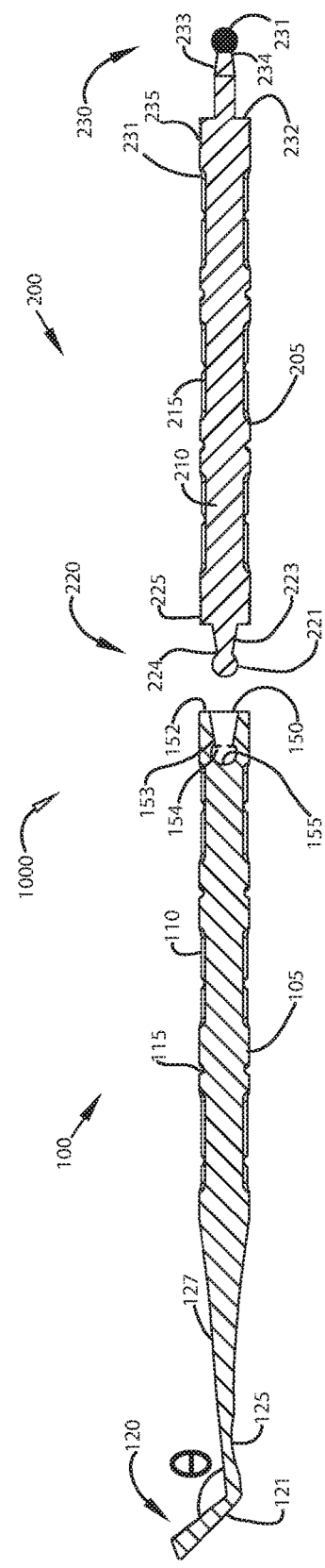
FIG. 3 is an elevational side diagrammatic cross sectional view of the dual-ended disposable multi-tool dental applicator apparatus with interchangeable tools, illustrating the first and second tool components separated in accordance with an embodiment of the present invention.
Figure 4:
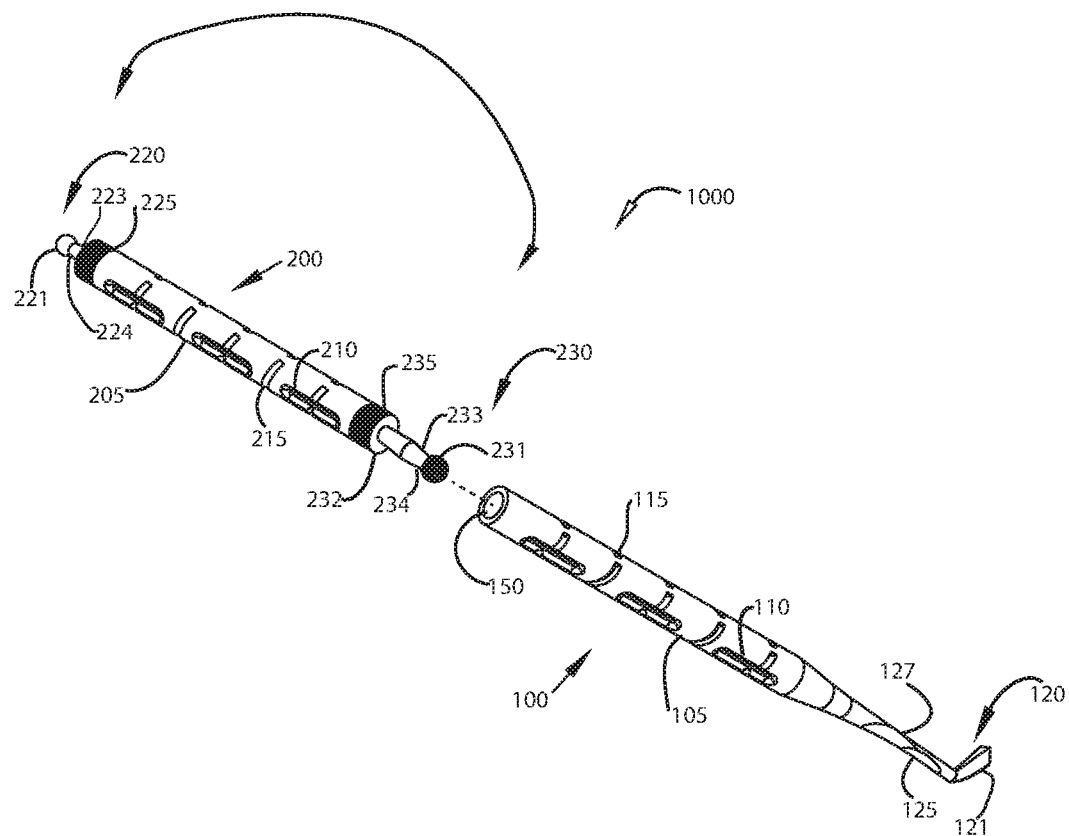
FIG. 4 is a perspective view of the dual-ended disposable multi-tool dental applicator apparatus with interchangeable tools, illustrating the interchangeability of the dual ended second applicator component in accordance with an embodiment of the present invention.

FIGS. 1-4 illustrate a dual-ended disposable multi-tool dental applicator apparatus having interchangeable tools 1000. FIG. 1 is an elevational side diagrammatic view of the dual-ended disposable multi-tool dental applicator apparatus with interchangeable tools 1000. This dual-ended disposable multi-tool dental applicator apparatus with interchangeable tools 1000, is comprised of a two major components: the first being a dental applicator tool with a receptacle (DATR) 100, and the second being a double sided dual tool applicator (DSDTA) 200. FIG. 1 shows the DATR 100 and the DSDTA 200 in an attached and connected configuration. FIG. 2 illustrates the dual-ended disposable multi-tool dental applicator apparatus with interchangeable tools 1000 with the DATR 100 and the DSDTA 200 in a detached and separated configuration. FIG. 3 also shows the DATR 100 and the DSDTA 200 in a detached and separated configuration, however by way of a cross sectional view; and FIG. 4 is a perspective view illustrating the DATR 100 and the DSDTA 200 in a detached and separated configuration, while showing the interchangeability of the DSDTA 200.

The DATR 100 comprises a cylindrical handle 105 having a proximal end 122 and a distal end 152 with a first dental application tool 120 at the proximal end, and tool receptacle 150 at the distal end 152. The handle 110 of the DATR 100 is substantially cylindrical and extends along a longitudinal axis and has a central axis along its length, and a width of approximately a quarter inch thick.

In this embodiment, the first dental application tool 120 is a spatula, however it is within the purview of one skilled in the art to recognize that the first dental application tool 120 can be any number of dental applicators such as for example any array of micro-brushes, long or short tipped applicators, and/or frangible tools, for providing ways of dispensing and distributing solutions, sealants, composites, and bonding materials during dental procedures.

In the embodiment shown in the figures, the first dental application tool 120 comprises a spatula having a wedged tool body 121 that is offset from the central axis of the cylindrical handle 105 at an offset angle ø of approximately 130 degrees, (plus or minus 5 degrees). The wedged tool body 121 of the spatula may have flat surfaces on both sides (as best seen in FIG. 4). This first dental application tool 120, which is coupled to the cylindrical handle 105 by a beveled handle portion 127, has a grooved recess 125 formed on an anterior side of the proximal end 122 to facilitate gripping, rotating, turning and general manipulation of said first dental application tool 120 while being used by the dentist or user. The wedged tool body 121 of the spatula has dimensions of a length of approximately an inch with a width of approximately a tenth of an inch and approximately 0.03 inches in width in a preferred embodiment.

On the opposite end of the DATR 100 at the distal end 152 is a tool receptacle 150 dimensioned and configured with recessed, interior circumferential beveled edges 153, a circumferential flange 154 and abutment 155 for receiving either of the set of tools on the proximal and distal ends of the DSDTA 200 (as can be best gleaned in the cross sectional FIG. 3).

The DSDTA 200 comprises a cylindrical handle 205 having a proximal end 222 and a distal end 232, with dental tools on both ends, as shown in FIGS. 2-4. In this embodiment, a first dental applicator tool 220 is a ball burnisher 221 (or condenser), and the second dental applicator tool 230 is a micro dental brush tool 231. As also shown in this embodiment, both the first dental applicator tool 220 and the second dental applicator tool 230 extend longitudinally from the cylindrical handle 205 and are centrally located along the longitudinal axis with respect to the central axis of the DSDTA 200. However, one of ordinary skill within the art would appreciate that one or the both of the first and second dental tools can be offset angularly from the central axis of the DSDTA 200. Moreover, the tools may be symmetrically or asymmetrically disposed with relation to one another with respect to the central axis of the cylindrical handle 205. Further considerations within the purview of the scope of the invention include one or both of the ends of the tool having frangibly attached tools, which can be removed during more complex dental procedures requiring multiple tools.

As conceptually illustrated in FIG. 4, the tools of the DSDTA 200 are interchangeable and may be flipped by the user to employ either the first dental applicator tool 220, or the second applicator tool 230 with ease by simply inverting the DSDTA 200 and inserting either tool 220 or 230 into the tool receptacle 150 of the DATR 100. For example, as the first dental applicator 220 is inserted and received within the tool receptacle 150, the circumferential flange 154 secures it in place, and the dual-ended disposable multi-tool dental applicator apparatus with interchangeable tools 1000 may be handled by the user to employ both the use of the second dental applicator tool 230 of the DSDTA 200, along with the first dental applicator tool 120 of the DATR 100.

Conversely and alternatively, when the first dental applicator tool 220 of the DSDTA 200 is to be used, it is simply removed from the tool receptacle 150, and the cylindrical handle 205 is flipped such that the second dental applicator tool 230 of the DSDTA 200 may then be inserted within the tool receptacle 150 such that the dual-ended disposable multi-tool dental applicator apparatus with interchangeable tools 1000 may be handled by the user to employ both the use of the first dental applicator tool 220 of the DSDTA 200, along with the first dental applicator tool 120 of the DATR 100.

Upon completion of a given procedure, the dual-ended disposable multi-tool dental applicator apparatus with interchangeable tools 1000 is rendered readily disposable. In a preferred embodiment, the dual-ended disposable multi-tool dental applicator apparatus with interchangeable tools 1000 has a length of approximately 6-7 inches extending from the DATR's 100 most proximal end at 122 to the DSDTA's 200 most distal end 232.

To facilitate gripping and handling during dental procedures, the dual-ended disposable multi-tool dental applicator apparatus with interchangeable tools 1000 has three sets of frictional enhancement means. This is a great convenience to the user or dentist working in a wet environment with saliva, blood, detritus, and other debris culminating from the procedure. A first set of frictional enhancement means is on both ends of the DSDTA 200 and abuts both the first dental applicator tool 220 and the second dental applicator tool 230 at the proximal end 222 of the cylindrical handle 205, as well as the distal end 232 and comprises an array of a plurality of circumferential grooves or ridges 225 and 235, respectively.

The second set of frictional enhancement means extend longitudinally along both the DATR 100 and the DSDTA 200. Along the DATR 100 is a set of elongated grooves 110 along the entire length of the body of the cylindrical handle 105. Along the DSDTA 200 is another set of elongated grooves 210 which extend along the entire length of the cylindrical handle 205. The elongated grooves 110 and 210 are a set of repeating cored indentations each having approximate dimensions of about 0.07 inches in depth, 0.9 inches wide and 0.4 inches long in a preferred embodiment.

The third set of frictional enhancement means spiral about the entire length of both cylindrical handles 105 and 205 of the DATR 100 and DSDTA 200 respectively, and comprise a set of spiral grooves 115 and 215 having an approximate dimension of 0.03 inches deep, spiraling at an angle of 0.23 degrees relative to the central axis of cylindrical handles 105 and 205, and extend about the entire length thereof from the proximal and distal ends of both the DATR 100 and DSDTA 200.

On the DSDTA 200, the pair of plurality of circumferential grooves 225 and 235 are perpendicular to the elongated grooves 210, and the set of spiral grooves 215 extend diagonally relative to the elongated groves 210, and in some instances may intersect thereof. The intricacies of the frictional enhancement means further facilitates ease in turning and rotating the dual-ended disposable multi-tool dental applicator apparatus with interchangeable tools 1000 about the work environment as well as inverting the tool about opposite ends depending on which of the three tools the dentist or user needs during the procedure.

Moreover, both ends of the DSDTA 200 have dental applicator tools with tapered or beveled portions that contribute to gripping/friction. The first dental applicator tool 220 has a tapered portion 223 with a reducing diameter, which further facilitates gripping and manipulation while using the condenser during a procedure. This tapered portion 223 also facilitates fine motor movement of the fingers by the dentist or user for condensing bonding materials and the like during procedures and helps to improve visibility when working in small spaces, such as between or within teeth. This first dental applicator tool, which may be a ball burnisher condenser tool 221, is formed as a spherical ball in the preferred embodiment, however it may take the other geometric shapes.

The second dental applicator tool 230 on the opposite end of the DSDTTA 200 has a tapered portion 223 with a reducing diameter, which further facilitates gripping and manipulation while using the condenser during a procedure. This second dental applicator tool 230, which may be a micro-dental brush 231 in the preferred embodiment and is used in applying materials to a surface, may also have a tapered portion 233 that also facilitates fine motor movement of the fingers by the dentist or user for condensing bonding materials and the like during procedures and helps to improve visibility when working in small spaces, such as between or within teeth.

The dual-ended disposable multi-tool dental applicator apparatus with interchangeable tools 1000 having double and triple tools on either end of the apparatus always provides at least two dental applicator tools for use at any one time during procedures. Thus the dual-ended applicator permits the dentist to quickly rotate the apparatus along the procedure, greatly reducing the time needed to apply the various materials, which enhances efficacy. Accordingly, the dentist can alternately apply two or more different materials to a single patient quickly and easily with minimum waste of time and materials, greatly reducing cost to the patient.

FIGS. 2-4 best illustrate the functionality of the interchangeable features of the DATR 100 and DSDTA 200 and the correlating dental applicator tools. Both the first and second dental applicator tools 220 and 230 of the DSDTA 200 have tapering beveled portions 223 and 233 that extend longitudinally from the cylindrical handle 205, that taper to a waist 224 and 234 of a reduced diameter. Correspondingly and matingly, the tool receptacle 150 of the DATR 100 is configured with corresponding recessed, interior circumferential beveled edges 153 that matingly receive either the first dental tool applicator 220 or alternatively, the second dental tool applicator 230. The tool receptacle 150 has a receiving abutment 155 that extends from the circumferential flange 154 that extends radially about, and from, the interior thereof for receiving and securing the waist 224 or 234 in position within the tool receptacle 150 once either tool is inserted (note cross-sectional view of FIG. 3).

The dual-ended disposable multi-tool dental applicator apparatus with interchangeable tools 1000 may be molded of a hard durable and rigid, and substantially rigid, solid plastic material. For example, it may be comprised of a suitable medical grade plastic having sufficient strength and rigidity, such as a Shore D rigid and hard plastic of a sufficient durometer to withstand the normal, tensile, tangential and other forces used when handling the apparatus during procedure. Although the dual-ended disposable multi-tool dental applicator apparatus with interchangeable tools 1000 is a disposable device, it may also be comprised of plastic materials that can be sterilized in an autoclave in the event that multiple uses are warranted.

Each of the distinct parts of the dual-ended disposable multi-tool dental applicator apparatus with interchangeable tools 1000, including the first dental applicator tool 120 of the DATR 100, the first and second dental applicator tools 220 and 230 of the DSDTA 200, as well as the handles 105 and 205 may have colors that is distinct from one another. For example, handle 105 may be black, and the handle 205 may be red, and the corresponding dental applicator tools 120, 220 and 230 could be white, green and yellow, as examples. However, any combination of distinct colors may be used. This is so that a user, such as a dentist, can easily distinguish either end. This is advantageous when different materials are being used for each applicator end. Moreover, in alternate embodiments, the dental applicator tools 220 and 230 may also contain one or more frangibly attached dental tool applicators extending from either or both of said first and second dental applicator tools 221 and 231, which may also be comprised of varying colors.

Accordingly, it should be appreciated that the present invention, in providing a relatively inexpensive, disposable applicator handle having an integrally formed, removable and interchangeable applicators on either end greatly reduces cost and waste; and, additionally, provides the user with flexibility in using a double ended applicator with either two or two or three independent and separate applicator tools.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. For example, it should be appreciated that other geometric shapes of the handle portions, such as for example, hexagonal, may be used to form the shapes of the handles 105 and 205. Moreover, the first and second dental applicator tools 220 and 230 of the DSDTA 200 and the first dental applicator tool 120 of the DATR 100 may be formed of other shapes, such as for example an ovoid shape.

As indicated, these modifications may be made to the present invention in light of the foregoing description of illustrated embodiments of the present invention and are to be included within the spirit and scope of the present invention.

What is claimed is:

1. A disposable dual ended multi tool dental applicator apparatus comprising:
   a first and second handle has handle bodies matingly connected to one another,
   wherein said first handle having a first dental applicator tool on one end and
   a tool receptacle on the opposite end; and,
   said second handle having second and third dental applicator tools on opposing ends thereof,
   and wherein said tool receptacle of the first handle is adapted and configured for removably and interchangeably and matingly receiving the second and third dental applicator tools of the second handle; and,
   wherein both said first and second handles each have sets of friction enhancement means extending about and along the handle bodies for facilitating gripping and manipulation of said handles.

2. The disposable dual ended multi tool dental applicator apparatus of claim 1,
   wherein said first handle comprises a spatula tool offset angularly relative to a central axis of said first handle; and
   said tool receptacle of the first dental applicator tool having a beveled recess and a circumferential flange for removably and interchangeably and matingly receiving the second and third dental applicator tools of the second handle.

3. The disposable dual ended multi tool dental applicator apparatus of claim 2,
   wherein said sets of friction enhancing means further comprise a first friction enhancing means, and
   wherein said first and second handle comprise a first friction enhancement means extending substantially circumferentially and longitudinally about said first and second handle bodies along the lengths thereof; and,
   another set of friction enhancement means extending longitudinally along the length of both said first and second handle bodies, and intersecting said first friction enhancement means.

4. The disposable dual ended multi tool dental applicator apparatus of claim 3,
   wherein said second handle has a third friction enhancement means comprising a pair of opposing circumferential grooves encircling the ends of said second handle body, for facilitating grip while using said apparatus.

5. The disposable dual ended multi tool dental applicator apparatus of claim 4,
   wherein the second and third dental applicator tools are configured with beveled ends tapering into a waist for alternatively securing said second and third dental applicators within said tool receptacle of said first handle.

6. The disposable dual ended multi tool dental applicator apparatus of claim 5,
   wherein said second dental applicator tool of said second handle comprises a ball burnisher condenser tool having a spherically formed tip; and,
   wherein said third dental applicator tool of said second handle comprises a micro-dental brush.

7. The disposable dual ended multi tool dental applicator apparatus of claim 6,
   wherein said first and second handles are comprised of hard, substantially rigid plastic materials.

8. The disposable dual ended multi tool dental applicator apparatus of claim 7,
   wherein said spatula tool is offset at an angle of approximately 130 degrees relative to said central axis of said first handle.

9. The disposable dual ended multi tool dental applicator apparatus of claim 8,
   wherein said first, second and third dental applicator tools each comprise a color distinct from one another.

10. The disposable dual ended multi tool dental applicator apparatus of claim 9,
    wherein said first friction enhancement means comprise a plurality of spiraling grooves descending along and circumferentially about the length of said first and second handle, and
    said second frictional enhancement means comprise a plurality of longitudinal grooves, and said plurality of said longitudinal grooves are diagonal to said plurality of spiraling grooves along the length of said first and second handles.

* * * * *